UNITED STATES PATENT OFFICE.

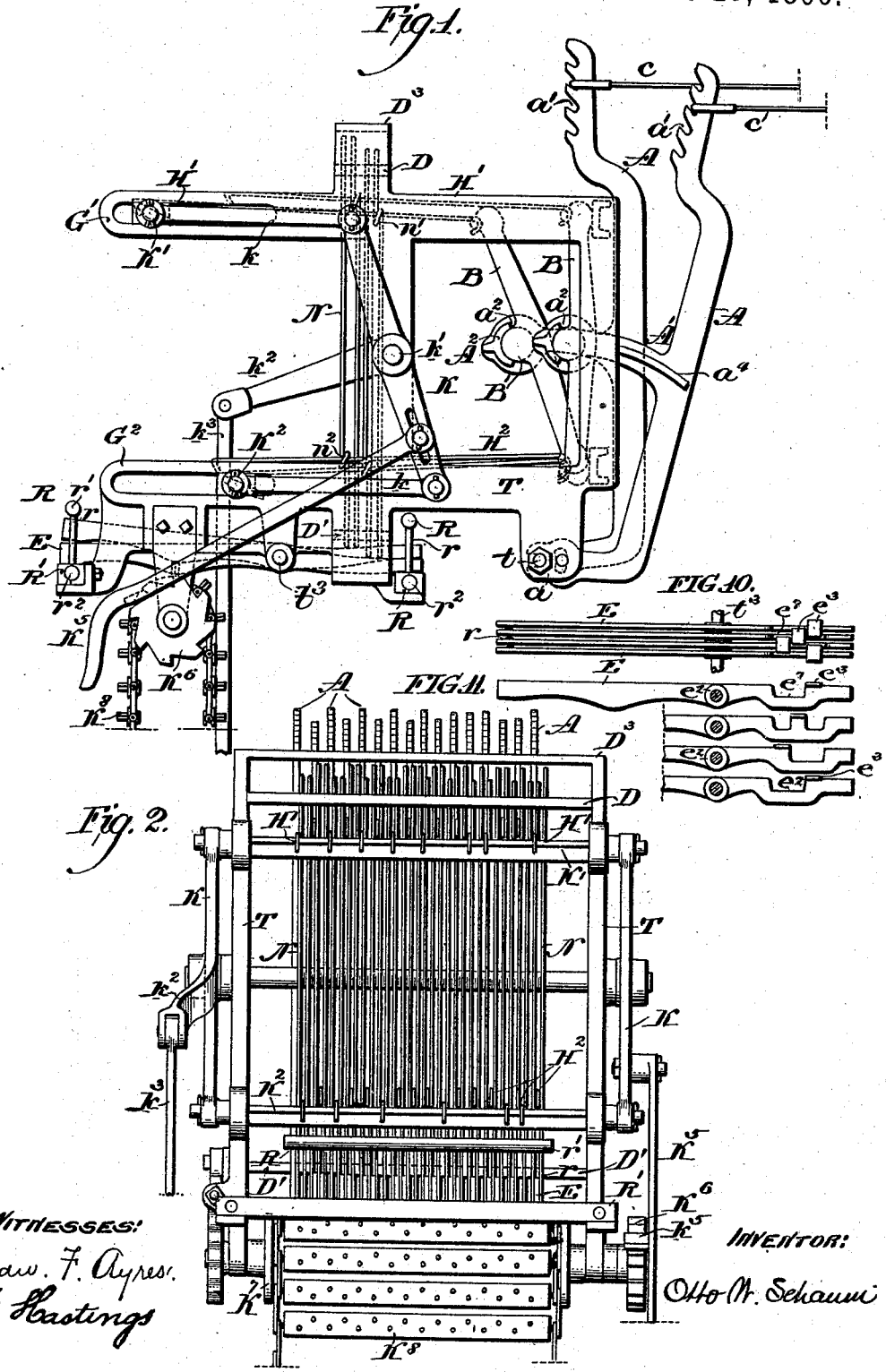

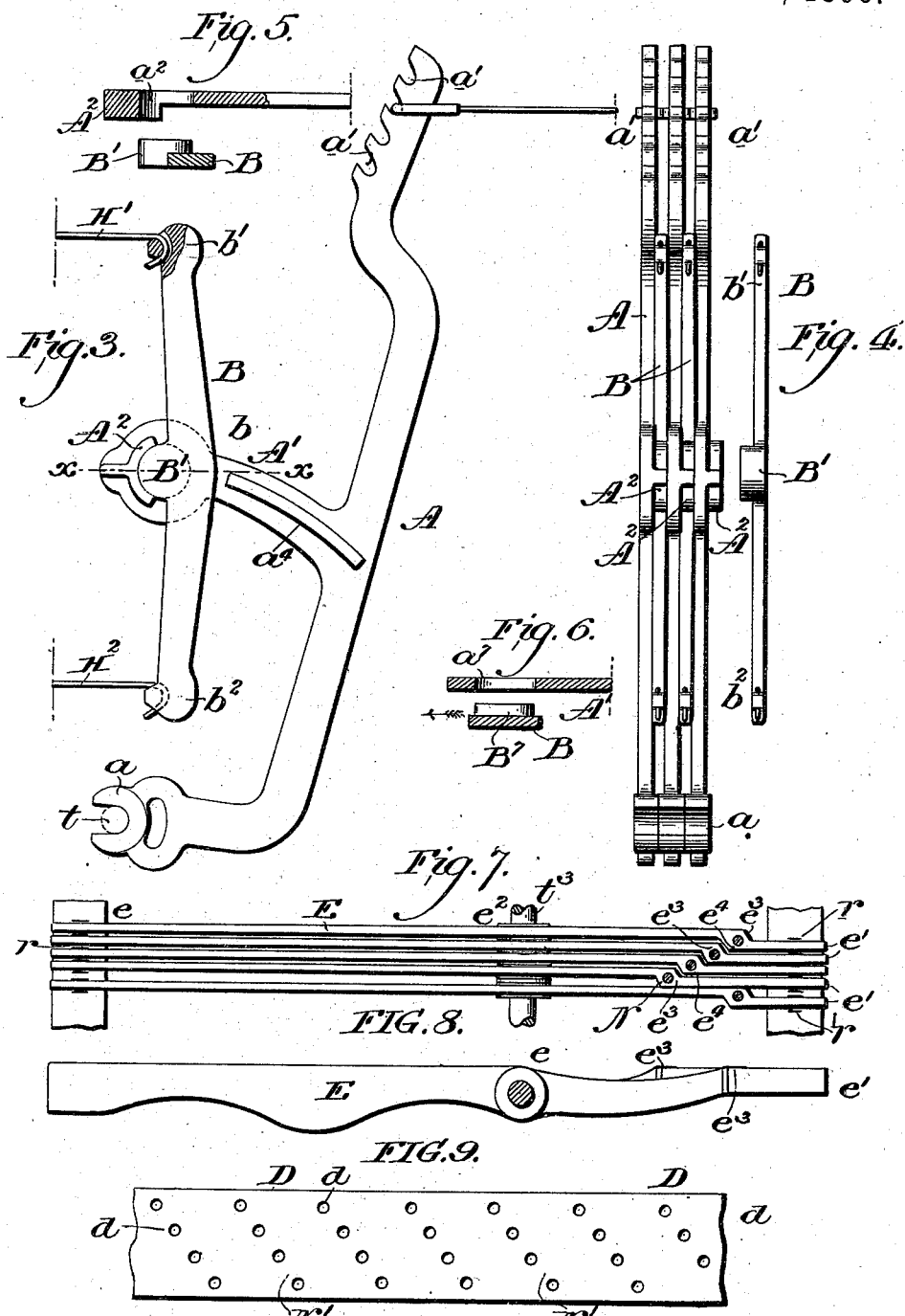

OTTO W. SCHAUM, OF PHILADELPHIA, PENNSYLVANIA.

SHEDDING MECHANISM FOR LOOMS.

SPECIFICATION forming part of Letters Patent No. 562,557, dated June 23, 1896.

Application filed March 5, 1894. Serial No. 502,365. (No model.)

*To all whom it may concern:*

Be it known that I, OTTO W. SCHAUM, a citizen of the United States, residing in Philadelphia, in the county of Philadelphia, in the State of Pennsylvania, have invented certain new and useful Improvements in Shedding Mechanism for Looms, of which the following is a true description, reference being had to the accompanying drawings, which form a part thereof.

My invention relates to shedding mechanism for looms, and has for its object, first, to provide an apparatus of the dobby type wherein the needles for actuating the hooks will be supported on broad bearings without necessitating any increase in the breadth of the machine; also, to guide the levers with which the machine is provided, so as to keep them exactly in place, and in general to improve the construction of this class of devices.

To these ends my invention consists in providing the levers which support the needles with platforms which are of greater width than the normal width of the levers, and preferably so arranged that the platform on one lever is behind the platform on the next lever of the series; also, in arranging guides at both the front and the back of the levers, and also in various improvements in the construction of the machine, which will be more particularly pointed out in claims which are appended to and form part of this specification.

My invention will be best understood as explained in connection with the accompanying drawings, in which—

Figure 1 is a side elevation of a shedding mechanism or dobby provided with my improvements. Fig. 2 is a front elevation of the apparatus shown in Fig. 1. Fig. 3 is an enlarged side view of one of the jacks, showing my improved means of securing the levers thereto. Fig. 4 is a front view of several of the jacks shown in Fig. 3, showing them arranged side by side and illustrating the improved bearing. Fig. 5 is a section on the line $x\ x$ of Fig. 3. Fig. 6 is a view of the usual mode of pivoting the levers and jacks together, taken on a section-line corresponding to that on which Fig. 5 is taken, to be used in comparison with that figure. Fig. 7 is a top view of several of the needle-levers on an enlarged scale. Fig. 8 is a side view of one of these levers. Fig. 9 is a top view of one of the guide-boards for the needles, showing the mode of arranging the guide-holes. Fig. 10 is a top view of levers similar to those shown in Fig. 7, illustrating a modification; and Fig. 11 is a side view of several of these levers.

T is a frame on which is supported the operative parts of the shedding mechanism or dobby.

A are jacks having notches $a$, by which they are pivoted on studs $t$, secured to the frame, and having notches $a'$, in which are secured cords $c$, which connect the jacks with the harness.

B are jack-levers pivoted to the jacks A.

$H'\ H^2$ are hooks connected to the top and bottom $b'\ b^2$ of the levers B.

$K'\ K^2$ are reciprocating knives which are adapted, when the hooks are in the proper position, to engage therewith and operate the jacks, and through them the harness.

$G'\ G^2$ are guides for the knives $K'\ K^2$. These knives may be operated in any convenient way. I have shown them connected by means of rods $k$ to levers K, which are secured to a shaft $k'$, which is pivoted in the frame of the machine.

$k^2$ is an arm connecting one of the levers K to some operative part of the machine by means of a rod $k^3$. An arm $K^5$, I have also shown as pivoted to one of the levers K, which arm is provided with a pawl $k^5$. This arm is adapted to engage with a ratchet $K^6$.

$K^7$ is a cylinder connected to and operated by the ratchet $K^6$ and carries the pattern blocks or cards $K^8$, which constitute the indicator mechanism.

It is, of course, evident that any other means for operating the knives may be used, if desired.

To decrease the wear of the pivotal connection between the levers B and jacks A, and also to insure that these levers cannot be pulled out of their place, I provide the pivotal connection with a wide bearing.

$a^2$ is a pivot-hole, preferably formed in the arm $A'$, as shown, and $B'$ is a pivot-stud adapted to have a bearing in the hole $a^2$.

In Fig. 6 I have illustrated the usual mode of arranging the pivot and pivot-hole, (here lettered $B^7$ and $a^7$,) and it will be seen that the bearing for the pivot-stud $B^7$ is simply the width of the arm $A'$, and that any force, as that of the hooks which draw the lever in the direction indicated by the arrow, will have a tendency to pull the lever out of engagement with the jack.

In my improved arrangement I make the pivot $B'$ of a width equal to the sum of the widths of the jack and lever, and provide a bearing-piece $A^2$, which, with the pivot-hole, forms a bearing-surface of a width equal to that of the pivot-stud $B'$. The bearing-piece $A^2$ is placed in the construction shown in front of the pivot-hole $a^2$, so as to increase the bearing on the side of the hole which is pressed against the supporting-pin $B'$ by the weight of the harness.

When the jacks are arranged side by side, as shown in Fig. 4, the bearing-pieces $A^2$ substantially fill up the space between the jacks, so that the levers will have no tendency to rattle loose, and the wear, of course, will be reduced on account of the increased surface and there will be no tendency to pull out. I also prefer to arrange wings $a^4$ on one or both sides of the jacks A to space them. These wings I prefer to make curved and as parts of a circle whose center is the pivot-rod $t$.

To guide the levers E, which are adapted to raise and lower the needles N and through them the hooks $H'$ $H^2$, which are connected to the needle by means of eyes $n'$ $n^2$, I provide a series of guides $r$, both at the front end $e$ and at the rear end $e'$ of said levers. These guides I preferably form as a reed R, $r'$ $r^2$ being two rods in which are secured strips of thin metal $r$, which serve to space and guide the levers.

I preferably secure the lower rod in a clamp $R'$, which is secured to the frame T.

By having the guides secured together by the rods $r'$ $r^2$, which form a frame for the strips $r$, the guides can be shifted one way or the other to adjust the position of the levers, as may be necessary.

It will be noted that by securing the needles and hooks positively together, as by passing the hooks through eyes in the needles, the hooks will be better operated and prevented from jumping, and also that the weight of the needle will aid in drawing down the hook to its normal position when released by the indicator mechanism.

Heretofore, in devices of this class, where needles or rods were operated by a series of levers, it has either been necessary to use very small needles or provide comparatively broad levers, so that the needle or rod will always be engaged by the one lever which is adapted to operate it.

If broad levers are employed, a dobby having the usual number of jacks is of necessity made very broad and becomes unwieldy. By my invention, however, a narrow dobby can be employed while the needles, which can be made of sufficiently large wire to be stiff, are provided with an ample bearing on the levers. This I accomplish by providing the levers with platforms of greater width than the thin pieces of metal of which said levers usually consist, and in order that the levers may be arranged close together I prefer to arrange the platform on one lever behind the platform of the next lever of the series.

In the construction shown in Fig. 7, the platforms are formed by turning the metal of the lever obliquely, as shown, and forming a platform $e^3$ of a width substantially double the normal width of the lever.

The next lever of the series has its platform arranged farther front than the platform on the first lever, and so on for a certain number of levers, four in the arrangement shown, the part $e^4$ of the platform and the rear end $e'$ of one lever being behind the main front part $e$ of the next lever and so on, whereby a bearing of twice the width is provided and yet the thickness of the levers is the same as before.

In Figs. 10 and 11 I have illustrated another mode of constructing the levers E, so that the broad bearing will be afforded the needles and so that the levers can be assembled, if anything, more compactly than in the arrangement shown in Figs. 7 and 8. The platforms $e^3$ are formed of small pieces, cast with or otherwise secured to the levers, and may be, as shown, three times the width of the levers, thus permitting very narrow levers to be used and still provide ample bearings for the needles.

To provide a space on which the platforms on neighboring levers can move freely, I cut out suitable spaces $e^7$ in the levers, as shown, to accommodate the platforms on neighboring levers.

The needles N are of course arranged in oblique lines corresponding to the position of the platforms, and to guide the needles I provide two boards or plates D $D'$, having holes $d$, through which the needles are adapted to pass, as seen in Fig. 2. These holes $d$ are arranged in oblique lines $N'$, as shown in Fig. 9. To prevent the needles from jumping up out of place, a plate or board $D^3$ is arranged over the upper board D and serves as a stop for the needles.

In operation the arm K is constantly being reciprocated by means of the rod $k^3$ and crank $k^2$, and reciprocates the knives $K'$ $K^2$ and operates the indicator mechanism $K^8$. The indicator raises the front end of certain of the levers E, which are pivoted at $e^2$ on a rod $t^3$, and so operate to drop the corresponding needles and move their hooks into the path of the knives.

The levers E can be adjusted by shifting the reeds R, if necessary, and are guided very exactly by these reeds. The needles N are provided with a broad bearing on the levers and are held in place by the perforated boards D and $D'$ and prevented from jumping out of their place by the plate $D^3$.

Having now described my invention, what I claim as new, and desire to secure by Letters Patent, is—

1. In shedding mechanism for looms, a jack A having a lever B pivoted thereto, the pivot connecting the jack and lever having a bearing of a width, substantially equal to the sum of the widths of the jack and lever.

2. In shedding mechanism for looms a jack A having a pivot-hole $a^2$, a lever B having a pivot $B'$ adapted to fit in the pivot-hole $a^2$, and a bearing-piece $A^2$ on the jack A of substantially the same width as the lever B, whereby an extended bearing of substantially the same width as the combined width of the jack and lever is provided.

3. In shedding mechanism for looms a jack A, an arm $A'$ extending from said jack, a pivot-hole $a^2$ in said arm $A'$, a lever B having a pivot $B'$ adapted to fit in the pivot-hole $a^2$ and a bearing-piece $A^2$ on the arm $A'$ of the jack of substantially the same width as the lever B, whereby an extended bearing of substantially the same width as the combined width of the jack and lever is provided.

4. In a shedding mechanism of the dobby type the combination of a series of levers each provided with a platform of greater width than the normal width of the lever, said platforms being arranged at different relative positions on adjoining levers so as not to interfere with each other, a series of needles each of which is adapted to rest on one of the platforms and be actuated by the lever to which its supporting-platform is secured and a suitable indicator mechanism for controlling the movement of the levers.

5. In a shedding mechanism of the dobby type the combination with a series of needles, of a series of levers, each provided with a platform, $e^3$, of greater width than the normal width of the lever, the platforms on adjoining levers being arranged at different relative positions thereon so as not to interfere with each other, and each serving to support a needle, a guide end $e'$ extending back from the platform and a suitable indicator mechanism for controlling the movement of the levers extending back from the platform on each lever.

OTTO W. SCHAUM.

Witnesses:
ARF. H. FABER,
EDWARD F. AYRES.